(12) United States Patent
Lee et al.

(10) Patent No.: US 12,411,604 B2
(45) Date of Patent: Sep. 9, 2025

(54) STORAGE SYSTEM, STORAGE DEVICE AND OPERATING METHOD THEREOF TO PROVIDE PERFORMANCE CORRESPONDING TO A PERFORMANCE INDEX

(71) Applicant: Samsung Electronics Co., Ltd., Suwon-si (KR)

(72) Inventors: Je-Min Lee, Suwon-si (KR); Jee-Seok Hyun, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/351,202

(22) Filed: Jul. 12, 2023

(65) Prior Publication Data
US 2024/0211135 A1 Jun. 27, 2024

(30) Foreign Application Priority Data
Dec. 27, 2022 (KR) .................. 10-2022-0186132

(51) Int. Cl.
*G06F 3/06* (2006.01)

(52) U.S. Cl.
CPC ............ *G06F 3/061* (2013.01); *G06F 3/0659* (2013.01); *G06F 3/0679* (2013.01)

(58) Field of Classification Search
CPC ...... G06F 3/061; G06F 3/0659; G06F 3/0679; G06F 3/0653; G06F 3/0611; G06F 3/0613; G06F 3/0634; G06F 3/0658; G06F 3/067; G06F 18/217; G06F 11/3409; G06N 3/048; G06N 3/08; G06N 3/084; G06N 5/041; G06N 20/00
See application file for complete search history.

(56) References Cited

U.S. PATENT DOCUMENTS

| | | | |
|---|---|---|---|
| 10,811,075 B1 | 10/2020 | Cheng et al. | |
| 10,877,667 B2 | 12/2020 | Karia et al. | |
| 11,048,581 B2 | 6/2021 | Sinha et al. | |
| 11,088,712 B2 | 8/2021 | Zamir et al. | |
| 11,119,693 B2 | 9/2021 | Ahn et al. | |
| 11,392,315 B1 | 7/2022 | Cady | |
| 11,474,735 B2 | 10/2022 | Jung et al. | |
| 2015/0270008 A1* | 9/2015 | Kim | G06F 12/0246 711/103 |
| 2017/0031816 A1* | 2/2017 | Lee | G06F 3/0661 |
| 2017/0205863 A1* | 7/2017 | Lee | G06F 1/3206 |

(Continued)

FOREIGN PATENT DOCUMENTS

| | | |
|---|---|---|
| JP | 6578694 B2 | 9/2019 |
| KR | 2021-0016203 A | 2/2021 |

*Primary Examiner* — Charles J Choi
(74) *Attorney, Agent, or Firm* — Harness, Dickey & Pierce, P.L.C.

(57) ABSTRACT

A controller of a storage device includes a plurality of performance units for controlling performance of the storage device, and controls a non-volatile memory device. A host device receives a plurality of first operating parameter values of each performance unit from the controller, generates a plurality of combinations for the plurality of performance units based on the plurality of first operating parameter values, and inputs the plurality of combinations into a machine learning model to infer a plurality of performance indices respectively corresponding to the plurality of combinations.

20 Claims, 15 Drawing Sheets

(56) References Cited

U.S. PATENT DOCUMENTS

| | | |
|---|---|---|
| 2021/0034280 A1* | 2/2021 | Jung .................... G06F 5/06 |
| 2021/0141538 A1 | 5/2021 | Sakai et al. |
| 2024/0103934 A1* | 3/2024 | Nomura ............... G06F 9/5094 |

* cited by examiner

| PERFORMANCE UNITS | AVAILABLE OPERATING PARAMETER VALUES |
|---|---|
| X1 | V11, V12, V13, V14, ⋯ |
| X2 | V21, V22, V23, V24, ⋯ |
| X3 | V31, V32, V33, V34, ⋯ |
| X4 | V41, V42, V43, V44, ⋯ |
| X5 | V51, V52, V53, V54, ⋯ |

| COMBINATIONS | C1 | C2 | C3 | C4 | C5 | C6 | | C1022 | C1023 | C1024 |
|---|---|---|---|---|---|---|---|---|---|---|
| X1 | V11 | V11 | V11 | V11 | V11 | V11 | | V14 | V14 | V14 |
| X2 | V21 | V21 | V21 | V21 | V21 | V21 | | V24 | V24 | V24 |
| X3 | V31 | V31 | V31 | V31 | V31 | V31 | ... | V34 | V34 | V34 |
| X4 | V41 | V41 | V41 | V41 | V42 | V42 | | V44 | V44 | V44 |
| X5 | V51 | V52 | V53 | V54 | V51 | V52 | | V52 | V53 | V54 |
| PERFORMANCE INDEX | Q1 | Q2 | Q3 | Q4 | Q5 | Q6 | | Q1022 | Q1023 | Q1024 |

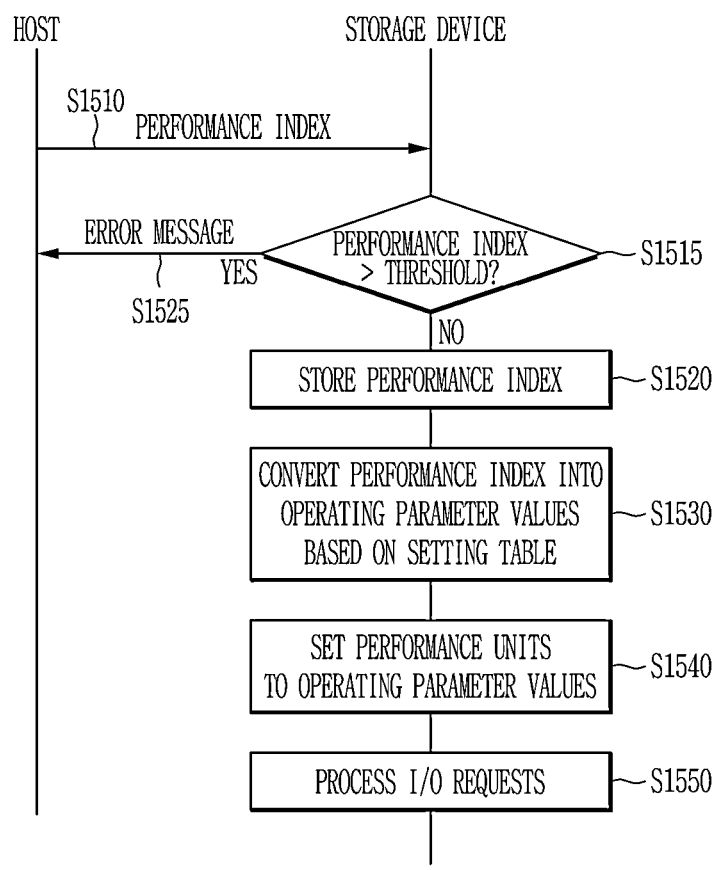

STORAGE SYSTEM, STORAGE DEVICE AND OPERATING METHOD THEREOF TO PROVIDE PERFORMANCE CORRESPONDING TO A PERFORMANCE INDEX

CROSS-REFERENCE TO RELATED APPLICATION

This application claims priority to and the benefit of Korean Patent Application No. 10-2022-0186132 filed in the Korean Intellectual Property Office on Dec. 27, 2022, the entire contents of which are incorporated herein by reference.

BACKGROUND

(a) Field

The present inventive concepts relate to storage systems, storage devices, and operating methods thereof.

(b) Description of the Related Art

Non-volatile memories such as flash memories are widely used as media for storage devices in computing devices. Due to physical characteristics of the non-volatile memory, various management operations may be performed inside the storage device to manage the storage device. The performance of the storage device may vary due to such management operations.

Typically, firmware of a storage device has solutions for maximizing or increasing the performance of the storage device, but if other services (e.g., reliable service) are required and/or advantageous, it may be necessary to provide performance corresponding to a performance index of the required services.

SUMMARY

Some example embodiments may provide a storage system, a storage device, and an operating method thereof, for providing performance corresponding to a required and/or advantageous performance index.

According to some example embodiments, a storage system may include a storage device and a host device. The storage device may include, for example, a non-volatile memory device and a controller. The controller may include, for example, a plurality of performance units configured to control a performance of the storage device and configured to control the non-volatile memory device. In some example embodiments, the host device may be configured to receive a plurality of first operating parameter values of each of the plurality of performance units from the controller, generate a plurality of combinations for the plurality of performance units based on the plurality of first operating parameter values of the plurality of performance units, input the plurality of combinations into a machine learning model to infer a plurality of performance indices respectively corresponding to the plurality of combinations, and provide an input performance index to the storage device. The controller may be further configured to retrieve a target combination corresponding to the input performance index from the plurality of combinations, and set the plurality of performance units to first operating parameter values included in the target combination from among the plurality of first operating parameter values.

According to some example embodiments, a storage device may include a non-volatile memory device and a controller. The non-volatile memory device may be configured to store a setting table generated by a machine learning model, and the setting table may include a plurality of performance indices and a plurality of operating parameter sets that are mapped to the plurality of performance indices, respectively. The controller may include a plurality of performance units configured to control performance of the storage device. The controller may be configured to receive an input performance index from a host device, retrieve a target performance index corresponding to the input performance index from the plurality of performance indices comprised in the setting table, retrieve a target operating parameter set mapped to the target performance index from the plurality of operating parameter sets, and set the plurality of performance units to the target operating parameter set.

According to some example embodiments, a method of operating a storage system including a host device and a storage device may be provided. The method may include providing an input performance index from the host device to the storage device, converting, by the storage device, the input performance index into a plurality of target operating parameter values based on a setting table generated by a machine learning model, and setting, by the storage device, a plurality of performance units configured to control performance of the storage device to the plurality of target operating parameter values, respectively.

BRIEF DESCRIPTION OF THE DRAWINGS

FIG. 8 is a diagram illustrating an example of an operating parameter value used in a setting table generation method according to some example embodiments.

FIG. 9 is a diagram illustrating an example of a setting table generated in a setting table generation method according to some example embodiments.

FIG. 14 and FIG. 15 each are a flowchart illustrating an example of an operating method of a storage system according to some example embodiments.

DETAILED DESCRIPTION

Figure 1:
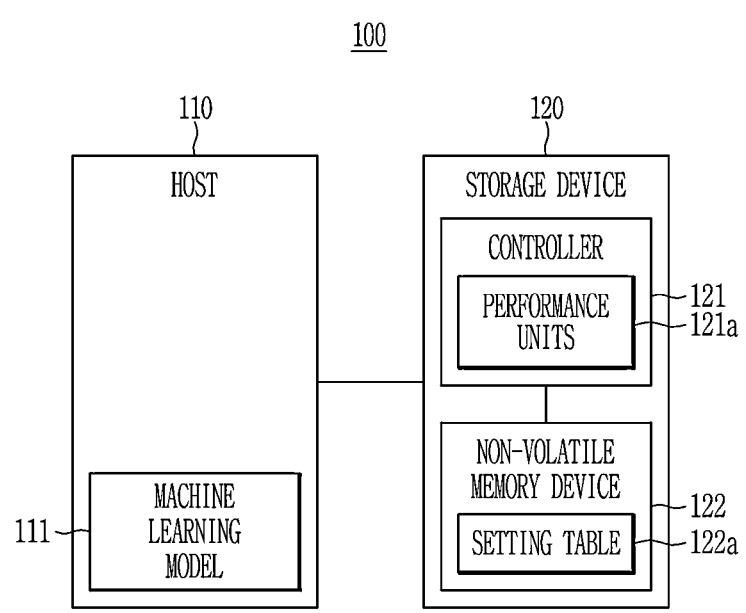
FIG. 1 is a block diagram illustrating an example of a storage system according to some example embodiments.

The present inventive concepts will be described more fully hereinafter with reference to the accompanying drawings, in which some example embodiments of the inventive concepts are shown. As those skilled in the art would realize, the described example embodiments may be modified in various different ways, all without departing from the spirit or scope of the present inventive concepts.

Accordingly, the drawings and description are to be regarded as illustrative in nature and not restrictive. Like reference numerals designate like elements throughout the specification. The sequence of operations or steps is not limited to the order presented in the claims or figures unless specifically indicated otherwise. The order of operations or steps may be changed, several operations or steps may be merged, a certain operation or step may be divided, and a specific operation or step may not be performed.

As used herein, the singular forms "a" and "an" are intended to include the plural forms as well, unless the context clearly indicates otherwise. Although the terms first, second, and the like may be used herein to describe various elements, components, steps and/or operations, these terms are only used to distinguish one element, component, step or operation from another element, component, step, or operation.

FIG. 1 is a block diagram illustrating an example of a storage system according to some example embodiments.

Referring to FIG. 1, in some example embodiments, the storage system 100 may include a host device 110 and a storage device 120. In some example embodiments, the storage system 100 may be a computing device, such as a personal computer (PC), a laptop, a server, a workstation, a tablet PC, or a smartphone.

In some example embodiments, the host device 110 may control an overall operation of the storage system 100. In some example embodiments, the storage device 120 may be used as a storage medium for the storage system 100. In some example embodiments, the storage device 120 may be removably connected to the host device 110. In some other example embodiments, the storage device 120 may be integrated within the host device 110 or non-removably connected to the host device 110.

In some example embodiments, the storage device 120 may include a controller 121 and a non-volatile memory device 122. The controller 121 may store data in the non-volatile memory device 122 and/or read data stored in the non-volatile memory device 122 in response to a request and/or command from the host device 110. In some other example embodiments, the controller 121 may generate a request based on an application executed by the controller 121 to store data in the non-volatile memory device 122 or read data stored in the non-volatile memory device 122.

In some example embodiments, the controller 121 may control a performance of the storage device 120 by controlling various performance units 121a. In some example embodiments, the performance of the storage device 120 may be expressed as a resultant value, such as input/output operations per second (IOPS) and/or maximum latency for input/output conditions such as random read, random write, sequential read, and/or sequential write. Each performance unit 121a may be a unit that controls the performance of the storage device 120, and may, for example, be provided within firmware of the controller 121. The various performance units 121a may include, for example, a write buffer size, a command queue depth, a wear-leveling cycle, a limit on a number of free blocks, a ratio of external tokens to internal tokens, a ratio of reclaim garbage collection processing, a program delay value, an erase delay value, and/or a range of available input/output processing.

In some example embodiments, the non-volatile memory device 122 may include a flash memory such as an NAND flash memory. In some other example embodiments, the non-volatile memory device 122 may include, for example, a phase-change memory, a resistive memory, a magneto resistive memory, a ferroelectric memory, or a polymer memory.

In some example embodiments, the host device 110 may transmit a performance index to the storage device 120. The performance index may be an index of indicating a reliability of a service, for example, the performance index may be an index indicating an advantageous and/or required level of reliability and/or throughput consistency of the storage device for the service, but example embodiments are not limited thereto. In some example embodiments, the performance index may be a performance index required and/or advantageous by a customer using the storage system 100, or a performance index required and/or advantageous by an application on the host device 110 that accesses the storage device 120. In some example embodiments, the performance index may include a quality of service (QoS) level and/or a throughput consistency. In some example embodiments, the throughput, or the throughout consistency, may be IOPS. In some example embodiments, the controller 121 of the storage device 120 may set operating parameter values of the plurality of performance units 121a based on the performance index received from the host device 110, and, for example, the controller may perform management operations corresponding to the plurality of performance units 121a based on the operating parameter values to perform, for example, a throttling operation of the storage device 120. In some example embodiments, the storage device 120 may store the performance index received from the host device 110 in the non-volatile memory device 122.

In some example embodiments, the storage device 120 may store a setting table 122a generated by a machine learning model 111 in the non-volatile memory device 122. In some example embodiments, the setting table 122a may include a plurality of performance indices and a plurality of operating parameter values that are mapped to the plurality of performance indices, respectively. In some example embodiments, the operating parameter values mapped to each of the plurality of performance indices may be an operating parameter set including a plurality of operating parameter values that correspond to the plurality of performance units 121a, respectively. In some example embodiments, in response to receiving the performance index from the host device 110, the controller 121 may retrieve the operating parameter values (or operating parameter set) mapped to the received performance index from the setting table 122a, set the plurality of performance units 121a to the retrieved operating parameter values (or operating parameter set), and perform the management operations corresponding to the plurality of performance units 121a.

Figure 2:
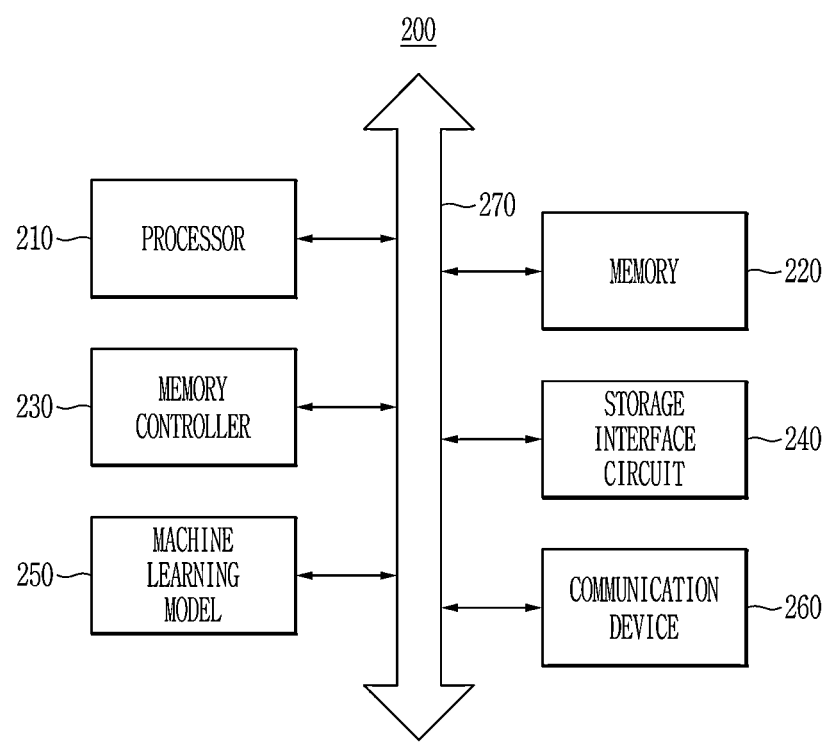
FIG. 2 is a block diagram illustrating an example of a host device of a storage system according to some example embodiments.

FIG. 2 is a block diagram illustrating an example of a host device 200 of a storage system (e.g., 100 of FIG. 1) according to some example embodiments.

Referring to FIG. 2, in some example embodiments, a host device 200 of a storage system (e.g., 100 of FIG. 1) may include a processor 210, a memory 220, a memory controller 230, a storage interface circuit 240, a machine learning model 250, a communication device 260, and a bus 270.

In some example embodiments, the processor 210 may control an overall operation of the host device 200. The processor 210 may be implemented with at least one of various processing units such as a central processing unit (CPU) and/or an application processor (AP).

In some example embodiments, the memory 220 may store various data and/or instructions. The memory 220 may be, for example, a dynamic random-access memory (DRAM). The memory controller 230 may control transfers of data and/or commands to the memory 220 and from the memory 220. In some example embodiments, the memory controller 230 may be provided as a separate chip from the processor 210. In some other example embodiments, the memory controller 230 may be provided as an internal component of the processor 210.

In some example embodiments, the storage interface circuit 240 may provide an interface with a storage device (e.g., 120 of FIG. 1) of a storage system (e.g., 100 of FIG. 1). The storage interface circuit 240 may be implemented as, for example, a peripheral component interconnect express (PCIe) interface. The processor 210 of the host device 200 may provide at least one command to the storage device 120 via the storage interface circuit 240. In some example embodiments, a non-volatile memory express (NVMe) protocol may be used as a storage protocol for the host device 200 to access the storage device 120. In some example embodiments, the host device 200 may provide an NVMe command which may include a performance index to the storage device 120. For example, the host device 200 may provide the NVMe command which may include the performance index to the storage device 120 through an NVMe command line interface (CLI). In some example embodiments, the host device 200 may provide the performance index to the storage device 120 through a vendor unique (VU) command.

In some example embodiments, the processor 210 may train the machine learning model 250, or the processor 210 may receive the trained machine learning model 250 from a separate computing device. In some example embodiments, the machine learning model 250 may be a model that has been trained based on operating parameter values of a plurality of performance units of the storage device 120 and a performance index corresponding to the operating parameter values and may, for example, infer a performance index from an input which may include operating parameter values of the plurality of performance units.

In some example embodiments, the communication device 260 may support wired and/or wireless communication of the host device 200. In some example embodiments, the bus 270 may provide at least a communication function between components of the host device 200. The bus 270 may include at least one type of bus depending on a communication protocol between the components.

Figure 3:
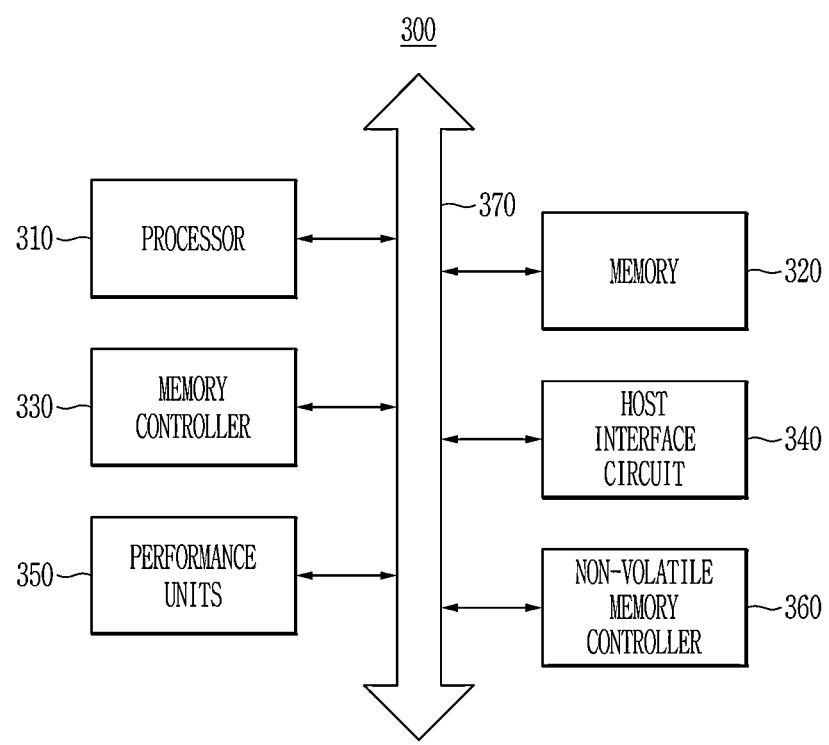
FIG. 3 is a block diagram illustrating an example of a controller of a storage device in a storage system according to some example embodiments.

FIG. 3 is a block diagram illustrating an example of a controller of a storage device in a storage system according to some example embodiments.

Referring to FIG. 3, in some example embodiments, a controller 300 of a storage device (e.g., 120 of FIG. 1) may include a processor 310, a memory 320, a memory controller 330, a host interface circuit 340, a plurality of performance units 350, a non-volatile memory controller 360, and a bus 370.

In some example embodiments, the processor 310 may control an overall operation of the controller 300. The memory 320 may store various data and/or instructions. The memory 320 may be, for example, a DRAM. In some example embodiments, the memory 320 may provide at least a write buffer and/or a command queue for the storage device (e.g., 120 of FIG. 1). In some example embodiments, the memory controller 330 may control transfers of data and/or commands to the memory 320 and from the memory 320. In some example embodiments, the memory controller 330 may be provided as a separate chip from the processor 310. In some example embodiments, the memory controller 330 may be provided as an internal component of the processor 310.

In some example embodiments, the host interface circuit 340 may provide an interface with a host device (e.g., 110 in FIG. 1) of the storage system (e.g., 100 in FIG. 1). The host interface circuit 340 may be implemented as, for example, a PCIe interface. In some example embodiments, the processor 310 may bring at least a command from the host device 110 through the host interface circuit 340 and store the command in the memory 320. In some example embodiments, the command may include a performance index provided by the host device 110.

In some example embodiments, firmware of the controller 300 may include a plurality of performance units 350 that control performance of the storage device (e.g., 120 in FIG. 1). In some example embodiments, the processor 310 may control the performance of the storage device (e.g., 120 in FIG. 1) by setting operating parameter values of the plurality of performance units 350 which may be included in the firmware. In some example embodiments, the processor 310 may determine operating parameter values corresponding to the performance index received from the host device 110 based on a setting table (e.g., 122a in FIG. 1) stored in a non-volatile memory device (e.g., 122 in FIG. 1) of the storage device (e.g., 120 in FIG. 1), and may control the plurality of performance units 350 based on the determined operating parameter values.

In some example embodiments, the non-volatile memory controller 360 may control transfers of data and/or commands to and from the non-volatile memory device 122. In some example embodiments, the non-volatile memory controller 360 may be a flash memory controller.

In some example embodiments, the bus 370 may provide a communication function between components of controller 300. The bus 370 may include at least one type of bus depending on a communication protocol between the components.

Figure 4:
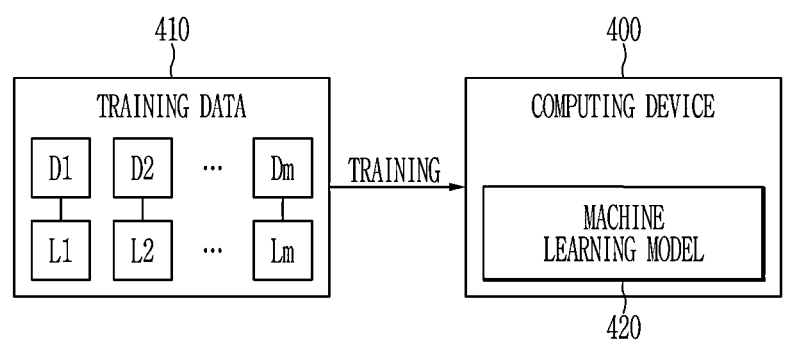
FIG. 4 is a diagram illustrating an example of a machine learning method according to some example embodiments.
Figure 5:
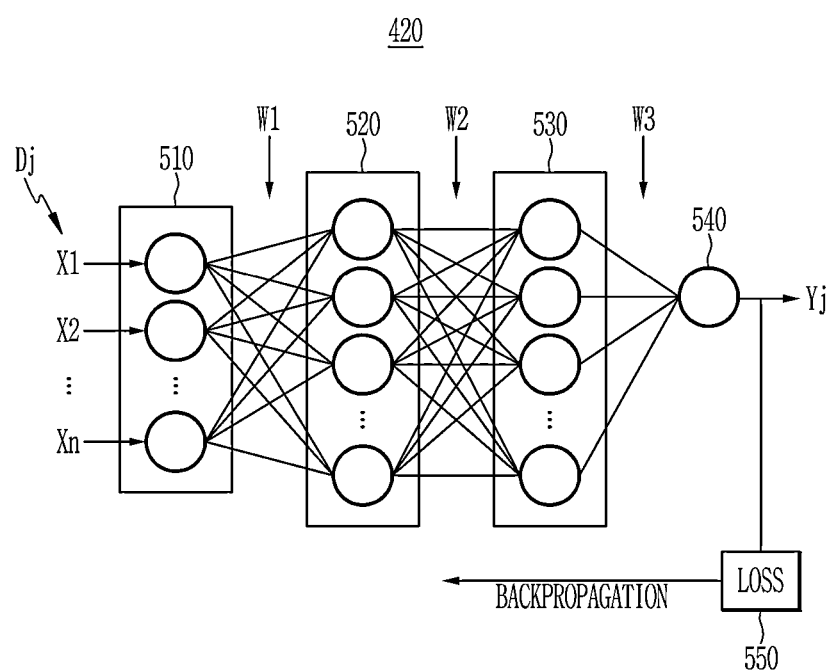
FIG. 5 is a diagram illustrating an example of a machine learning model according to some example embodiments.

FIG. 4 is a diagram illustrating an example of a machine learning method according to some example embodiments, and FIG. 5 is a diagram illustrating an example of a machine learning model according to some example embodiments.

Referring to FIGS. 4 and 5, in some example embodiments, a computing device 400 may train a machine learning model 420 by inputting training data 410 into the machine learning model 420, for example, the training data may include a plurality of training samples D1, D2 . . . Dm, and the plurality of training samples D1, D2 . . . Dm may correspond to a plurality of performance indices L1, L2 . . . Lm. In some example embodiments, the machine learning model 420 may be implemented based on a neural network. For example, the neural network may include a deep neural network (DNN).

In some example embodiments, for training the machine learning model 420, the training data 410 which may include the plurality of training samples D1, D2 . . . Dm and the plurality of performance indices L1, L2 . . . Lm may be given. Each training sample Dj of the plurality of training samples, D1, D2 . . . Dm, may include operating parameter values of a plurality of performance units X1, X2 ... Xn. In some example embodiments, j is an integer between 1 and m. Each training sample Dj of the plurality of training samples, D1, D2 ... Dm may be labeled with a performance index Lj of the plurality of performance indices L1, L2 ... Lm corresponding to the operating parameter values of the plurality of performance units X1 to Xn. In some example embodiments, j is an integer between 1 and m. The plurality of performance units X1 to Xn may be factors that control performance of the storage device 120. The performance index Lj may include, for example, a QoS level and/or a throughput consistency.

In some example embodiments, the machine learning model 420 may include an input layer 510, a plurality of hidden layers 520 and 530, and an output layer 540. In FIG. 5, although the two hidden layers 520 and 530 are shown for convenience, the number of hidden layers 520 and 530 is not limited thereto. In some example embodiments, the input layer 510 may receive the training samples Dj. Values of the input layer 510, which may include the operating parameter values, may be mapped to values of the first hidden layer 520 in a fully connected manner, for example, based on a nonlinear transformation. For example, the values of the input layer 510 may be mapped to the values of the first hidden layer 520 based on parameters of the machine learning model 420 including weights W1 between the input layer 510 and the first hidden layer 520. Similarly, in the hidden layers 520 and 530, values of each and/or the first hidden layer 520 may be mapped to values of a next hidden layer 530 in a fully connected manner, for example, based on a non-linear transformation. For example, the values of each and/or the first hidden layer 520 may be mapped to the values of the next hidden layer 530 based on parameters of the machine learning model 420 including weights W2 between the first hidden layer 520 and the next hidden layer 530. Values of the last hidden layer 530 may be mapped to a value of the output layer 540 in a fully connected manner, for example, based on a non-linear transformation. For example, the values of the last hidden layer 530 may be mapped to the value of the output layer 540 based on parameters of the machine learning model 420 including weights W3 between the last hidden layer 530 and the output layer 540. In some example embodiments, a transformation based on an activation function may be performed in addition to the non-linear transformation when mapping to each layer, for example when mapping from layer 510 to 540. The activation function may include, for example, a rectified linear (ReLU) function or a sigmoid function. The value of the output layer 540 may be output, for example, as a value Yj inferred in the machine learning model 420.

The computing device 400 may calculate a loss 550 based on the value Yj inferred by inputting the training sample Dj into the machine learning model 420 and the performance index label Lj (e.g., QoS level) of the corresponding training sample Dj, and may update the machine learning model 420, for example, by backpropagating the loss 550 to the machine learning model 420. In some example embodiments, the computing device 400 may update the parameters which may include the weights W1, W2, and W3 for the layers 510 to 540 of the machine learning model 420 based on the loss 550. By repeating the above-described processes, the computing device 400 may train the machine learning model 420 based on the training data 410 to determine the parameters which may include the weights W1, W2, and W3.

In some example embodiments, the computing device 400 may be a storage system (e.g., storage system 100 of FIG. 1). In some example embodiments, a host device (e.g., 110 in FIG. 1) of the storage system 100 may train the machine learning model 420 based on the training data 410 stored in the non-volatile memory device (e.g., 122 in FIG. 1). In some example embodiments, the host device 110 may store the trained machine learning model 420 in the non-volatile memory device 122.

In some example embodiments, the computing device 400 may be a separate computing device from the storage system 100. In some example embodiments, the computing device 400 may provide the trained machine learning model 420 to the storage system 100, and the host device 110 of the storage system 100 may store the trained machine learning model 420 in the non-volatile memory device 122.

Figure 6:
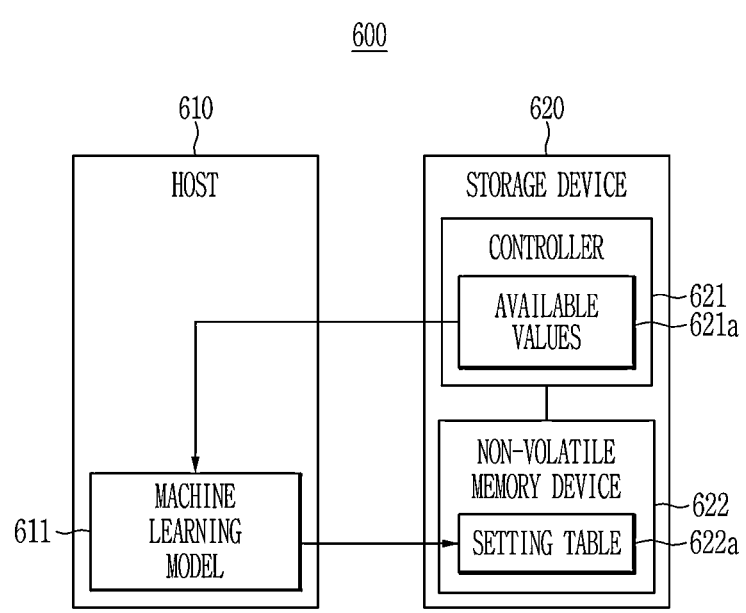
FIG. 6 is a diagram illustrating an example of a setting table generation method according to some example embodiments.
Figure 7:
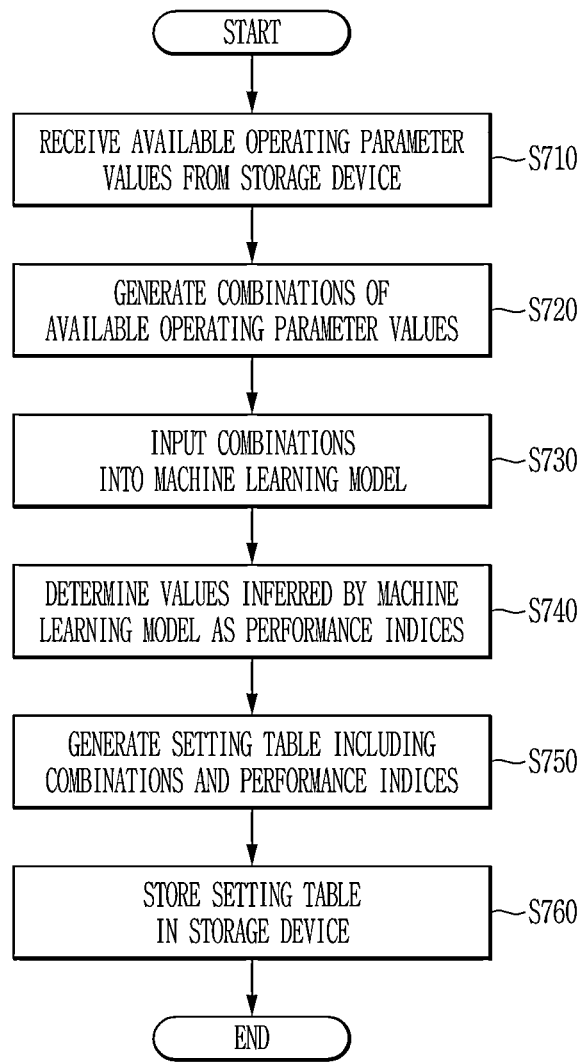
FIG. 7 is a flowchart illustrating an example of a setting table generation method according to some example embodiments.
Figure 10:
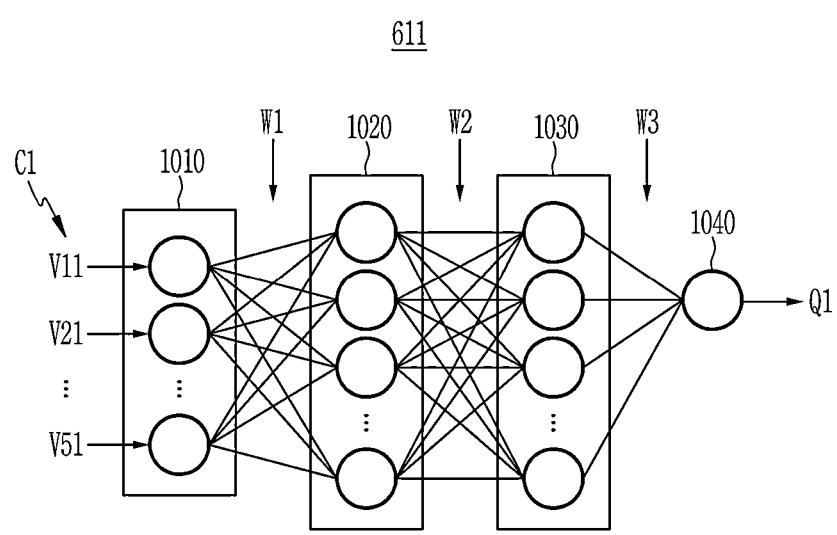
FIG. 10 is a diagram illustrating an example of performance index inference in a setting table generation method according to some example embodiments.

FIG. 6 is a diagram illustrating an example of a setting table generation method according to some example embodiments, FIG. 7 is a flowchart illustrating an example of a setting table generation method according to some example embodiments, FIG. 8 is a diagram illustrating an example of an operating parameter value used in the setting table generation method according to some example embodiments, FIG. 9 is a diagram illustrating an example of a setting table generated in a setting table generation method according to some example embodiments, and FIG. 10 is a diagram illustrating an example of performance index inference in a setting table generation method according to some example embodiments.

Referring to FIG. 6, a host device 610 of storage system 600 may generate a setting table 622a using a machine learning model 611. In some example embodiments, the machine learning model 611 may be the machine learning model 420 generated through operations described with reference to example embodiments illustrated in FIGS. 4 and 5.

In some example embodiments, operating parameter values (e.g., available values) 621a that may be used for various performance units X1, X2, X3, X4, and X5, with reference to example embodiments illustrated in FIG. 5, may be set in the storage device 620. In some example embodiments, as illustrated in FIG. 8, various operating parameter values Vi1, Vi2, Vi3, and Vi4 that may be applied to each performance unit Xi may be set in the storage device 620. In some example embodiments, i is an integer between 1 and 5. In some example embodiments, as illustrated in FIG. 8, although five performance units X1 to X5 and four operating parameter values Vi1 to Vi4 available for each performance unit X1 to X5 are shown for convenience, the number of performance units X1 to X5 and the number of available operating parameter values Vi1 to Vi4 are not limited thereto. In some example embodiments, the number of available operating parameter values Vi1 to Vi4 may vary for each performance unit X1 to X5. In some example embodiments, as illustrated in FIG. 6, a controller 621 of the storage device 620 may store the available operating parameter values 621a. In some other example embodiments, a non-volatile memory device 622 of the storage device 620 may store the available operating parameter values 621a, and the controller 621 may load the available operating parameter values 621a from the non-volatile memory device 622.

Referring to FIGS. 6 to 9, in some example embodiments, the host device 610 may receive the available operating parameter values 621a of the performance units X1 to X5 from the storage device 620 in S710. The host device 610 may generate various combinations, for example, C1 to C1024 of the available operating parameter values 621a of the performance units X1 to X5 in S720. Referring to FIGS. 8 and 9, in some example embodiments, an operating parameter value Vi1 to Vi4 of each performance unit X1 to X5 included in each combination C1 to C1024 may be a value selected from the available operating parameter values 621a of each performance unit X1 to X5. In some example embodiments, as shown in FIG. 9, the host device 610 may generate various combinations C1 to C1024 such as a combination C1 in which the operating parameter values of the performance units X1 to X5 are respectively set to V11, V21, V31, V41, and V51, a combination C2 in which the operating parameter values of the performance units are respectively set to V11, V21, V31, V41, and V52, a combination C3 in which the operating parameter values of the performance units are respectively set to V11, V21, V31, V41, and V53, a combination C4 in which the operating parameter values of the performance units are respectively set to V11, V21, V31, V41, and V54, a combination C5 in which the operating parameter values of the performance units are respectively set to V11, V21, V31, V42, and V51, a combination C6 in which the operating parameter values of the performance units are respectively set to V11, V21, V31, V42, and V52, a combination C1022 in which the operating parameter values of the performance units are respectively set to V14, V24, V34, V44, and V52, a combination C1023 in which the operating parameter values of the performance units are respectively set to V14, V24, V34, V44, and V53, a combination C1024 in which the operating parameter values of the performance units are respectively set to V14, V24, V34, V44, and V54. In some example embodiments, as illustrated in FIG. 9, some example combinations C1 to C6 and C1022 to C1024 among the various combinations C1 to C1024 are shown for convenience.

In some example embodiments, with reference to FIG. 7, the host device 610 may input the combinations C1 to C1024 of the available operating parameter values 621a of the performance units X1 to X5 into the machine learning model 611 in S730, and determine values inferred by the machine learning model 611 as performance indices Q1 to Q1024 for the respective combinations in S740. For example, the host device 610 may input the combination C1 in which the operating parameter values of the performance units X1 to X5 are set to V11, V21, V31, V41, and V51, respectively, as input data, into the machine learning model 611, and set the value inferred by the machine learning model 611 as the performance index Q1 of the combination C1.

In some example embodiments, as shown in FIG. 10, the machine learning model 611 may include an input layer 1010, a plurality of hidden layers 1020 and 1030, and an output layer 1040 as described with reference to FIG. 5. In some example embodiments, when the host device 610 inputs each combination (e.g., C1, C2, C3, C4, C5, C6 . . . C1022, C1023, and C1024) of the operating parameter values Vi1 to Vi4 of the performance units X1 to X5 into the machine learning model 611, the operating parameter values Vi1 to Vi4 of each combination C1, C2, C3, C4, C5, C6 . . . C1022, C1023, and C1024 may be input into the input layer 1010 of the machine learning model 611. Values of the input layer 1010, which may include the operating parameter values of each combination, may be mapped to values of the first layer 1020 based on, for example, operating parameter values including weights W1 between the input layer 1010 and the first hidden layer 1020. Similarly, values of each hidden layer, for example, the first layer 1020, may be mapped to values of the next hidden layer 1030 based on, for example, operating parameter values including weights W2 between the first hidden layer 1020 and the next hidden layer 1030. Values of the last hidden layer 1030 may be mapped to a value of the output layer 1040 based on, for example, operating parameter values including weights W3 between the last hidden layer 1030 and the output layer 1040. The operating parameter values which may include the weights W1, W2, and W3 may be set by training of the machine learning model 611, as described with reference to FIGS. 4 and 5. The value of the output layer 1040 may be output as the inferred value Q1 of the machine learning model 611, e.g., the performance index Q1.

In some example embodiments, the host device 610 may input each of the various combinations C1 to C1024 of the operating parameter values of the performance units X1 to X5 into the machine learning model 611 to infer the performance indices Q1 to Q1024 respectively corresponding to the various combinations C1 to C1024.

In some example embodiments, the host device 610 may generate a setting table 622a which may include each combination Cj of the operating parameter values of the performance units X1 to X5 and the performance index Qj mapped to the combination Cj, In some example embodiments j is an integer between 1 and 1024 as shown in FIG. 9, in S750, and store the setting table 622a in the non-volatile memory device 622 of the storage device 620 in S760.

As described above, in some example embodiments, the setting table 622a may include the performance indices Q1 to Q1024 that are respectively mapped to the various combinations C1 to C1024 of operating parameter values of the performance units X1 to X5 may be generated by using the machine learning model 611.

Figure 11:
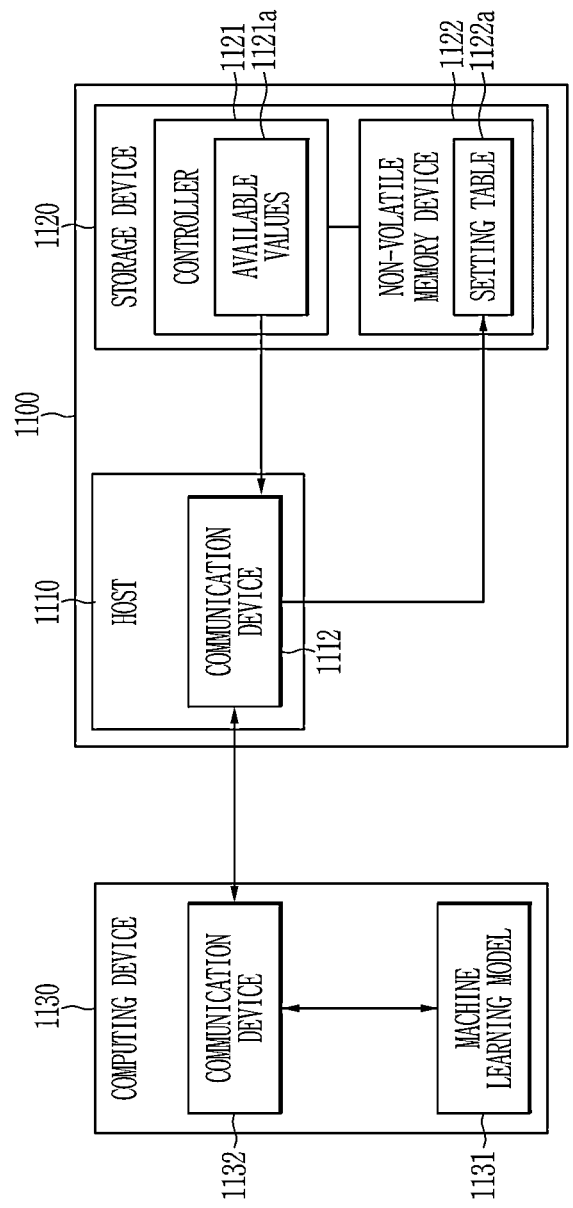
FIG. 11 is a diagram illustrating an example of a setting table generation method according to some example embodiments.
Figure 12:
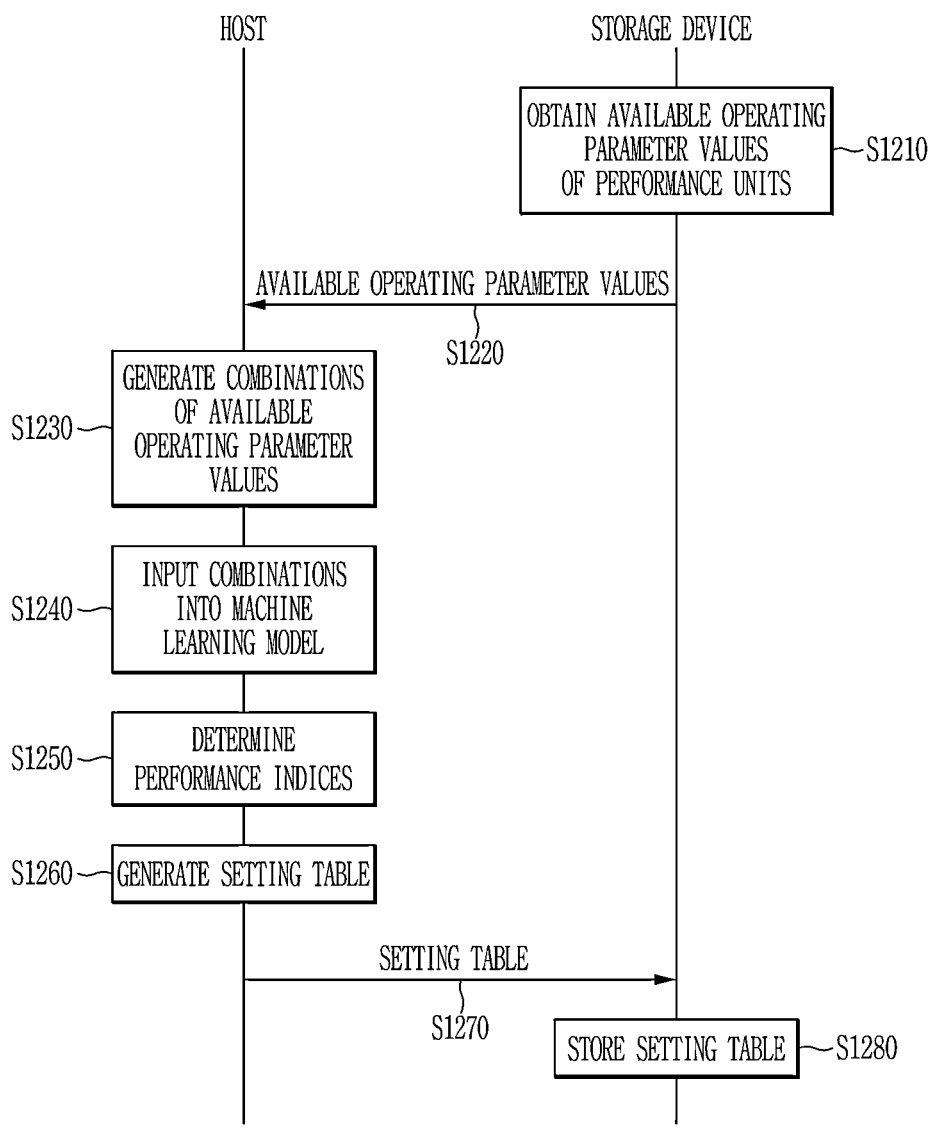
FIG. 12 is a flowchart illustrating an example of a setting table generation method according to some example embodiments.

FIG. 11 is a diagram illustrating an example of a setting table generation method according to some example embodiments, and FIG. 12 is a flowchart illustrating an example of a setting table generation method according to some example embodiments.

Referring to FIG. 11, in some example embodiments, a storage system 1100 may be connected to a computing device 1130. In some example embodiments, a host device 1110 of the storage system 1100 may include a communication device 1112, and the computing device 1130 may also include a communication device 1132. The host device 1110 of the storage system 1100 and the computing device 1130 may be wired or wirelessly connected through the communication devices 1112 and 1132. The computing device 1130 may use a machine learning model 1131 to generate a setting table 1122a and provide the setting table 1122a to the storage system 1100 through the communication device 1132. In some example embodiments, the machine learning model 1131 may be a machine learning model 420 generated as described with reference to FIGS. 4 and 5.

As described with reference to FIGS. 4 to 10, in some example embodiments, available operating parameter values 1121a for the various performance units X1 to X5 may be set in a storage device 1120 of the storage system 1100. In some example embodiments, as shown in FIG. 8, the various operating parameter values Vi1, Vi2, Vi3, and Vi4 that may be applied to each performance unit Xi may be set in the storage device 1120.

Referring to FIGS. 11 and 12, in some example embodiments, the host device 1110 may obtain the available operating parameter values 1121a of the performance units X1 to X5 from the storage device 1120 in S1210, and provide the available operating parameter values 1121a of the performance units X1 to X5 to the computing device 1130 in S1220. The computing device 1130 may generate various combinations C1 to C1024 of the available operating parameter values 1121a of the performance units X1 to X5, as shown in FIG. 9, in S1230.

In some example embodiments, the computing device 1130 may input the combinations C1 to C1024 of the available operating parameter values 1121a of the performance units X1 to X5 into the machine learning model 1131 in S1240, and may determine values inferred by the machine learning model 1131 as performance indices Q1 to Q1024 for the combinations C1 to C1024, respectively, in S1250. The computing device 1130 may generate a setting table 1122a which may include each combination Cj of the operating parameter values of the performance units X1 to X5 and the performance index Qj mapped to the combination Cj, as shown in FIG. 9, in 1260, and provide the setting table 1122a to the storage system 1100 in S1270. The host device 1110 of the storage system 1100 may store the setting table 1122a in a non-volatile memory device 1122 of the storage device 1120 in S1280.

As described above, in some example embodiments, the storage system 1100 may receive the setting table 1122a generated by the machine learning model 1131 from the external computing device 1130.

Figure 13:
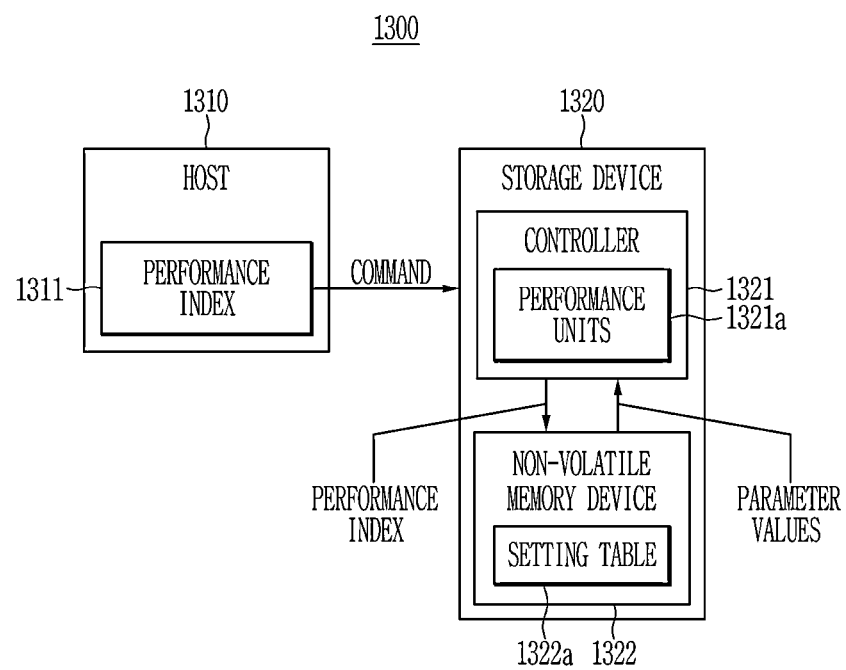
FIG. 13 is a diagram illustrating an example of an operating method of a storage system according to some example embodiments.
Figure 14:
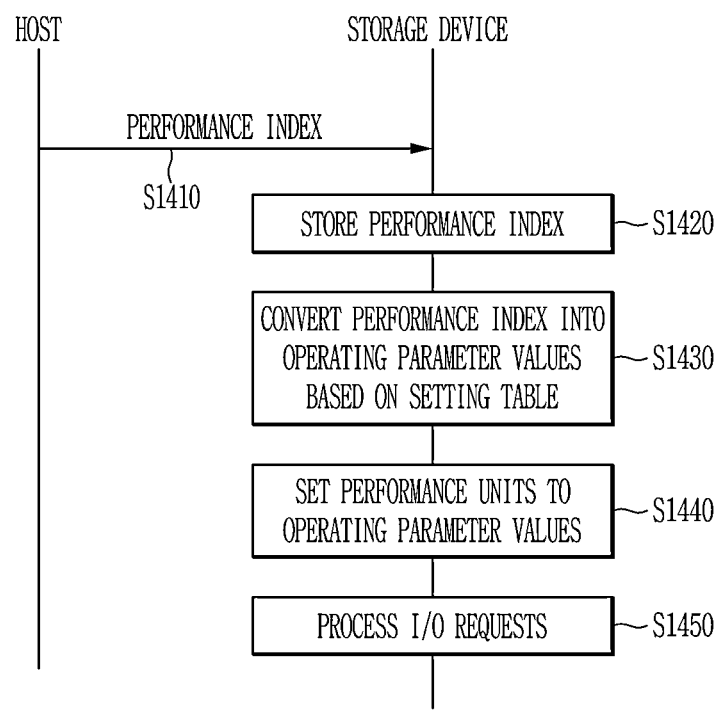

FIG. 13 is a diagram illustrating an example of an operating method of a storage system according to some example embodiments, and FIG. 14 and FIG. 15 each are a flowchart illustrating an example of an operating method of a storage system according to some example embodiments.

Referring to FIG. 13, in some example embodiments, a storage system 1300 may include a host device 1310 and a storage device 1320. The storage device 1320 may include a controller 1321 and a non-volatile memory device 1322. The controller 1321 may include a plurality of performance units 1321a. The non-volatile memory device 1322 may store a setting table 1322a. In some example embodiments, the setting table 1322a may be generated as described with reference to FIGS. 4 to 12.

Referring to FIGS. 13 and 14, in some example embodiments, the host device 1310 may provide an input performance index 1311 to the storage device 1320 in S1410. In some example embodiments, a customer using the storage device 1320 may set the input performance index 1311 on the host device 1310. In some example embodiments, an application operating on the host device 1310 may set the input performance index 1311. In some example embodiments, the host device 1310 may provide a command which may include the input performance index 1311 to the storage device 1320 via a storage interface circuit (e.g., 240 in FIG. 2). The command may be, for example, an NVMe command or a VU command.

In some example embodiments, the controller 1321 of the storage device 1320 may convert the input performance index 1311 received from the host device 1310 into operating parameter values of a plurality of performance units 1321a based on a setting table 1322a in S1430. In some example embodiments, the controller 1321 may input the input performance index 1311 as a query into the setting table 1322a, retrieve a target performance index corresponding to the input performance index 1311 from among a plurality of performance indices (e.g., Q1 to Q1024 in FIG. 9) included in the setting table 1322a, and retrieve the operating parameter values mapped to the target performance index from the setting table 1322a. For example, in some example embodiments, if the received performance index 1311 is Q5, the controller 1321 may retrieve the operating parameter values V11, V21, V31, V42, and V51 mapped to the performance index Q5 from the setting table 1322a. In some example embodiments, if the same or substantially the same performance index as the input performance index 1311 exists in the setting table 1322a, the controller 1321 may retrieve the operating parameter values mapped to the same or substantially the same performance index. In some example embodiments, if the same or substantially the same performance index as the input performance index 1311 does not exist in the setting table 1322a, the controller 1321 may retrieve a performance index that is closest to the input performance index 1311 among the plurality of performance index in the setting table 1322a, and retrieve the operating parameter values mapped to the searched performance index.

In some example embodiments, the controller 1321 may set operating parameter values of the plurality of performance units 1321a to the operating parameter values converted from the input performance index 1311 in S1440. In some example embodiments, the controller 1321 may perform, for example, a throttling operation of the storage device 1320 by setting the operating parameter values of the plurality of performance units 1321a to the operating parameter values converted from the input performance index 1311. In some example embodiments, if the plurality of performance units 1321a include a write buffer size, a queue depth, a wear-leveling cycle, a limit on the number of free blocks, and a garbage collection processing rate, the controller 1321 may set a size of a write buffer allocated to a memory (e.g., 320 in FIG. 3) to V11 and a depth of a command queue allocated to the memory 320 to V21. Further, in some example embodiments, the controller 1321 may set a wear-leveling period, a limit on the number of free blocks, and a garbage collection processing rate to V31, V42, and V51, respectively.

In some example embodiments, the controller 1321 may process input/output requests from the host device 1310 based on the set operation parameter values of the performance units 1321a in S1450. For example, the controller 1321 may write data to the non-volatile memory device 1322 or read data from the non-volatile memory device 1322 based on the set operation parameter values of the performance units 1321a.

Thus, in some example embodiments, the storage device 1320 may provide performance that satisfies the performance index required by host device 1310. For example, in some example embodiments, the storage device 1320 may provide input/output services at a QoS level required by the host device 1310, or may provide input/output services at an IOPS consistency required by the host device 1310.

In some example embodiments, the controller 1321 may store the input performance index 1311 in the non-volatile memory device 1322 of the storage device 1320 in S1420. Thus, in some example embodiments, even if a power down occurs in the storage system 1300, the controller 1321 may perform, for example, the throttling operation based on the performance index 1311 stored in the non-volatile memory device 1322 after power recovery.

Referring to FIGS. 13 and 15, in some example embodiments, the host device 1310 may provide the input performance index 1311 to the storage device 1320 in S1510. The controller 1321 of the storage device 1320 may determine, for example, whether the input performance index 1311 exceeds a threshold of a performance index that can be provided by the storage device 1320 in S1515. In some example embodiments, if the input performance index 1311 exceeds the threshold in S1515, the storage device 1320 may not provide performance satisfying the input performance index 1311, so the controller 1321 may, for example, send to the host device 1310 an error message indicating that the input performance index 1311 exceeds the threshold in S1525. Accordingly, in some example embodiments, the host device 1310 may provide a new input performance index to the storage device 1320 in response to the error message received in S1525.

In some example embodiments, if the input performance index 1311 does not exceed the threshold in S1515, the controller 1321 may, for example, convert the input performance index 1311 received from the host device 1310 into operating parameter values for the plurality of performance units 1321a based on the setting table 1322a in S1530. In some example embodiments, if the input performance index 1311 does not exceed the threshold in S1515, the controller 1321 may store the input performance index 1311 in the non-volatile memory device 1322 of the storage device 1320 in S1520. The controller 1321 may set operating parameter values of the plurality of performance units 1321a to the operating parameter values converted from the input performance index 1311 in S1540. The controller 1321 may process input/output requests from the host device 1310 based on the set operating parameter values of the performance units 1321a in S1550.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

As described herein, any devices, electronic devices, modules, models, units, and/or portions thereof according to any of the example embodiments, and/or any portions thereof may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, electronic devices, modules, units, and/or portions thereof according to any of the example embodiments.

Further any of the machine learning models or elements described herein, may, for example, use various artificial neural network organizations and processing models, the artificial neural network organizations including, for example, a convolutional neural network (CNN), a deconvolutional neural network, a recurrent neural network optionally including a long short-term memory (LSTM) and/or a gated recurrent unit (GRU), a stacked neural network (SNN), a state-space dynamic neural network (SSDNN), a deep belief network (DBN), a generative adversarial network (GAN), and/or a restricted Boltzmann machine (RBM), and/or the like; and/or include linear and/or logistic regression, statistical clustering, Bayesian classification, decision trees, and/or the like.

Any of the memories described herein may be a non-volatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM).

While the inventive concepts have been shown and described with reference to some example embodiments thereof, it will be understood that various changes in form and details may be made therein without departing from the spirit and scope of the following claims.

What is claimed is:

1. A storage system comprising:
 a storage device comprising:
  a non-volatile memory device configured to store a setting table generated by a machine learning model, the setting table including a plurality of performance indices and a plurality of first operating parameter values that are mapped to the plurality of performance indices, respectively, and
  a controller comprising a plurality of performance units configured to control a performance of the storage device, and configured to control the non-volatile memory device; and
 a host device configured to:
  receive the plurality of first operating parameter values of each of the plurality of performance units from the controller,
  generate a plurality of combinations for the plurality of performance units based on the plurality of first operating parameter values of the plurality of performance units,
  input the plurality of combinations into the machine learning model to infer the plurality of performance indices respectively corresponding to the plurality of combinations, and
  provide an input performance index to the storage device,
 wherein the controller of the storage device is further configured to:
  retrieve a target combination corresponding to the input performance index from the plurality of combinations;
  retrieve first operating parameter values mapped to the target combination from the plurality of first operating parameter values; and
  set the plurality of performance units to the first operating parameter values included in the target combination from among the plurality of first operating parameter values.

2. The storage system of claim 1, wherein the controller is further configured to store the input performance index in the non-volatile memory device.

3. The storage system of claim 1, wherein the controller is further configured to:
 receive a second input performance index from the host device; and
 send an error message to the host device in response to the second input performance index exceeding a threshold.

4. The storage system of claim 1, wherein the host device is further configured to provide the input performance index to the storage device through a non-volatile memory express (NVMe) command or a vendor unique (VU) command.

5. The storage system of claim 1, wherein the input performance index comprises a quality of service (QoS) level and/or a throughput consistency.

6. The storage system of claim 1, wherein each of the plurality of combinations comprises second operating parameter values of the plurality of performance units, and
wherein the second operating parameter values are selected from the plurality of first operating parameter values.

7. The storage system of claim 6, wherein the host device is further configured to:
generate the setting table mapping the second operating parameter values of the plurality of performance units included in each of the plurality of combinations, to a corresponding performance index among the plurality of performance indices; and
provide the setting table to the storage device.

8. The storage system of claim 7, wherein the controller is further configured to store the setting table in the non-volatile memory device.

9. The storage system of claim 7, wherein the controller is further configured to retrieve, as the target combination, the second operating parameter values mapped to a target performance index corresponding to the input performance index among the plurality of performance indices from the setting table.

10. The storage system of claim 1, wherein the controller is further configured to process input/output requests from the host device based on the plurality of performance units that are set to the first operating parameter values comprised in the target combination.

11. The storage system of claim 1, wherein the plurality of first operating parameter values of each of the plurality of performance units are available operating parameter values for each of the performance units.

12. A storage device comprising:
a non-volatile memory device configured to store a setting table generated by a machine learning model, the setting table comprising a plurality of performance indices and a plurality of operating parameter sets that are mapped to the plurality of performance indices, respectively; and
a controller comprising a plurality of performance units configured to control performance of the storage device, the controller configured to:
receive an input performance index from a host device,
retrieve a target performance index corresponding to the input performance index from the plurality of performance indices comprised in the setting table,
retrieve a target operating parameter set mapped to the target performance index from the plurality of operating parameter sets, and
set the plurality of performance units to the target operating parameter set, each of the plurality of performance units including at least one of a write buffer size, a queue depth, a wear-level cycle, a limit on a number of free blocks, or a garbage collection processing rate.

13. The storage device of claim 12, wherein each of the plurality of operating parameter sets comprises a plurality of operating parameter values corresponding to the plurality of performance units, respectively, and
wherein the controller is further configured to set the plurality of performance units to the plurality of operating parameter values comprised in the target operating parameter set, respectively.

14. The storage device of claim 12, wherein the controller is further configured to:
provide a plurality of operating parameter values of each of the plurality of performance units to the host device; and
receive the setting table that is generated by the machine learning model based on the plurality of operating parameter values of the plurality of performance units from the host device.

15. The storage device of claim 14, wherein the plurality of performance indices comprise values that are inferred by the machine learning model into which a plurality of combinations generated from the plurality of operating parameter values of the plurality of performance units are input,
wherein the plurality of combinations correspond to the plurality of operating parameter sets, respectively, and
wherein each of the plurality of combinations comprises an operating parameter value selected from among the plurality of operating parameter values of each of the plurality of performance units.

16. The storage device of claim 12, wherein the controller is further configured to:
provide a plurality of operating parameter values of each of the plurality of performance units to a computing device via the host device; and
receive, via the host device, the setting table generated by the machine learning model based on the plurality of operating parameter values of the plurality of performance units in the computing device.

17. The storage device of claim 12, wherein the input performance index comprises a quality of service (QOS) level and/or a throughput consistency.

18. The storage device of claim 12, wherein the controller is further configured to store the input performance index in the non-volatile memory device.

19. A method of operating a storage system comprising a host device and a storage device, the method comprising:
providing an input performance index from the host device to the storage device;
converting, by the storage device, the input performance index into a plurality of target operating parameter values based on a setting table generated by a machine learning model, the storage device including a non-volatile memory device configured to store the setting table generated by the machine learning model, the setting table including a plurality of performance indices and a plurality of operating parameter sets that are mapped to the plurality of performance indices, respectively; and
setting, by a controller of the storage device, a plurality of performance units configured to control performance of the storage device to the plurality of target operating parameter values, respectively, each of the plurality of performance units including at least one of a write buffer size, a queue depth, a wear-level cycle, a limit on a number of free blocks, or a garbage collection processing rate.

20. The method of claim 19,
wherein each of the plurality of operating parameter sets comprises a plurality of operating parameter values respectively corresponding to the plurality of performance units.

* * * * *